April 7, 1942.  H. A. HADLEY  2,279,041
CONVEYER WEIGHING SCALE
Filed June 12, 1939  4 Sheets-Sheet 1

INVENTOR
HARLAN A. HADLEY
BY Paul L. Kirlin
ATTORNEY

April 7, 1942.  H. A. HADLEY  2,279,041
CONVEYER WEIGHING SCALE
Filed June 12, 1939  4 Sheets-Sheet 3

INVENTOR
HARLAN A. HADLEY
BY Paul L. Koehler
ATTORNEY

Patented Apr. 7, 1942

2,279,041

UNITED STATES PATENT OFFICE 2,279,041

CONVEYER WEIGHING SCALE

Harlan A. Hadley, St. Johnsbury, Vt., assignor to Fairbanks, Morse & Co., Chicago, Ill., a corporation of Illinois Application June 12, 1939, Serial No. 278,606

12 Claims. (Cl. 265—5)

This invention relates to conveyer weighing scale apparatus adapted for use with article conveying assemblies, as gravity-feed, roller type conveyers or the like, the invention having particular reference to control mechanism and an improved means of operating the control mechanism and weighing apparatus, for determining and recording the weight of but one article at a time, during conveyance of the articles by the conveyer system.

An important object of the invention is the provision in an article conveying system, of a dial scale assembly of automatic weight recording type, having a conveyer section of suitable type, adjustably mounted upon the scale weighing platform, and article transfer control means operatively associated with the scale assembly and conveyer system, whereby articles in transit over the conveyer system may be weighed and the weights thereof recorded, the arrangement and function of the control means being such as to prevent the introduction of more than one article at a time to the scale conveyer section.

Another object resides in the provision of automatic control mechanism for the purpose indicated, effective to admit one article at a time to the weight determining section of the conveyer, and further effective to retain the article on said conveyer section for a predetermined period of time sufficient for the operation of the weighing and weight-recording mechanism to determine and record the weight of the article.

A further object is to provide a control mechanism functioning as above indicated, which is rendered effective at the termination of the weighing and weight recording period, to permit discharge of the article weighed, from the weighing conveyer section, and in response to the discharge of the article from the said conveyer section, becomes effective to admit a subsequent article to the weighing conveyer section.

Further objects and advantages attained by the invention will appear readily from the following description of a preferred embodiment thereof, as illustrated by the accompanying drawings, in which.

Figure 1:
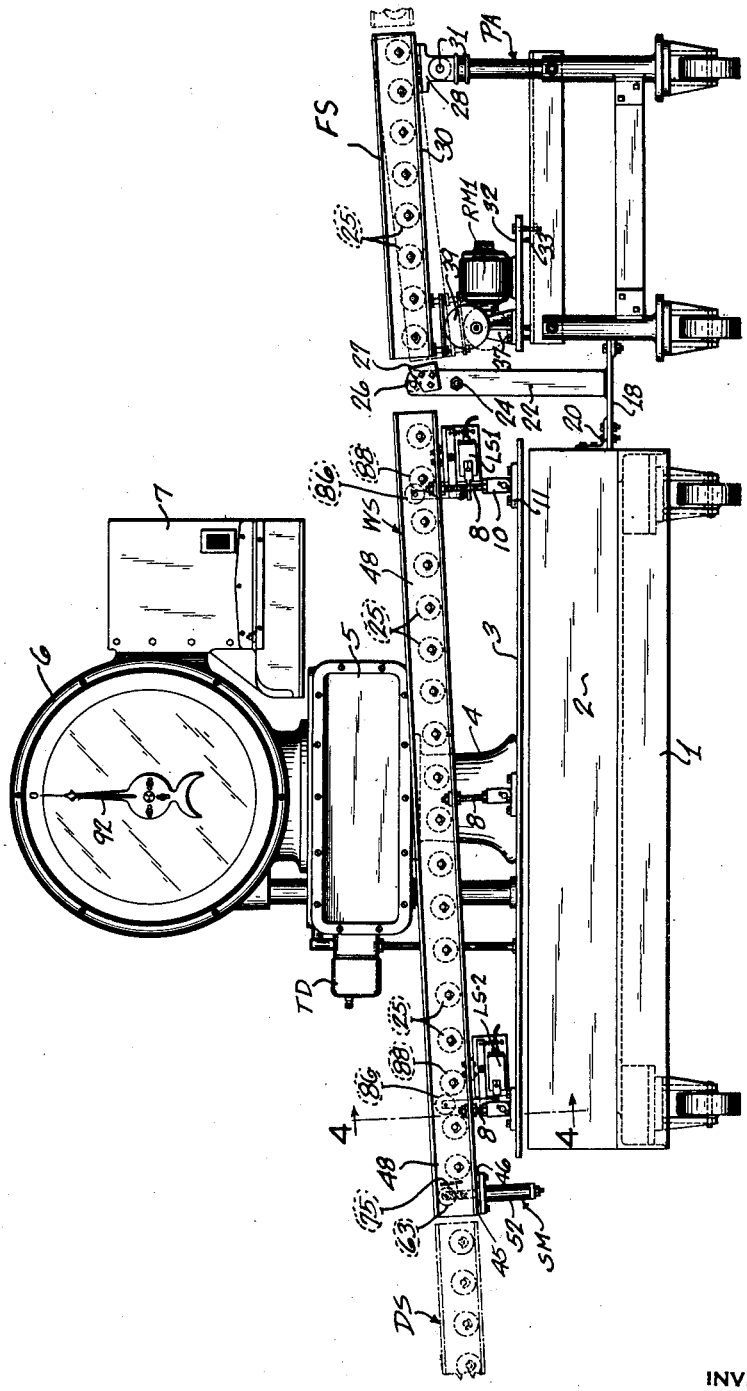
Fig. 1 is a front elevation, showing a preferred form of conveyer weighing scale of weight recording type and control mechanism associated therewith, as applied to a conveyer system.

In the drawings I designates the base frame of the conveyer scale unit, on which rests the scale base 2 which houses and supports the scale platform levers (not shown), the scale base in turn supporting the scale platform 3. For portability and so that the conveyer scale unit may be introduced with a minimum of effort, in any one of a number of conveyer systems, the base frame I is supported upon wheels or casters as shown. A columnar housing 4 is mounted on the base 2 at one side of the platform and provides a support for a beam housing 5, the latter supporting a dial housing 6. A housing 7 mounted on the side of the dial housing 6, encloses weight recording mechanism (not shown) of suitable type, which is operated by a motor indicated as RM—2 in the circuit diagram of Fig. 6. The structure features and operation of the weight recording mechanism utilized in the present invention, are fully shown and described in copending application, Serial No. 118,778, filed January 2, 1937, and therefore, will not be treated in detail herein.

The weighing section WS of the conveyer system is mounted on the platform 3 by means of vertically adjustable elements or legs 8 each of which is threaded over substantially the entire length thereof (Figs. 1 and 2), each leg being adapted for pivotal movement toward either end of the conveyer about a short pin 9 which extends through a clevis 10 and the upper extension 11 of a leg standard 12, the base of the standard 12 being bolted to the platform 3. The lower end of each leg 8 is screwed into a threaded hole in the clevis 10 and is adjustably held in place by a lock nut 13. The upper ends of the legs 8 project through openings in the lower flanges 17 of the conveyer channels or side rails 47 and 48, and are secured thereto by lock nuts 14 and 15. Adjustment of the conveyer section WS vertically above platform 3 may be accomplished by loosening the locking nuts 14 and 15, and then displacing the section WS into the desired position, whereupon turning up the lock nuts 14 and 15, the latter tightly against the bevelled washers 16, will effectively maintain the section in the desired position. In this manner the weighing section of the conveyer WS can be raised or lowered, and disposed at various angles within limits, to permit the articles to be weighed, to move under the influence of gravity along the conveyer over the conveyer rollers 25.

A conveyer unit PA preferably termed an approach or feeder unit, since this unit incorporates control mechanism for controlling delivery of articles to be weighed, to the conveyer scale section WS, is mounted on wheels or casters as shown, to render the unit portable for the same reason that the weighing unit WS is made portable. Normally, the approach unit PA is attached to the scale mechanism (Figs. 1 and 2) by means of connecting plates 18 and 19 bolted to L-shaped brackets 20 and 21, attached to the end of the scale base 2. The connecting plates 18 and 19 also support the approach stop mechanism, which includes upwardly extending side arms 22 and 23 welded at their lower ends to the connecting plates, the side arms being structurally connected by a tie rod 24 which is held in place by lock nuts at each end. Between the upper ends of the side arms 22 and 23 is mounted a stop roller 26 similar in form to the rollers 25 of the conveyer sections. A stop plate 27, the ends of which are bent at right angles to its flat surface and bolted to the side arms 22 and 23, is arranged so that its upper horizontal edge is slightly below the top surface of the roller 26 (Fig. 2). The purpose of this stop plate 27 is to provide a guard or stop against which the article or unit to be weighed will abut when the feeding section FS of the conveyer is in its lowered or inoperative position, as shown in dotted outline in Fig. 1, and as will be hereinafter described. The stop plate is further arranged so that its flat surface is at an acute angle to the vertical, so that when it stops an article from going onto the weighing section of the conveyer, it will require no great force to lift the conveyer feeder section FS and the article to a position from which the article may roll on over the roller 26 onto the weighing section WS of the conveyer. It can be seen readily that if the stop plate 27 were mounted so that its flat surface was vertical, considerable rubbing friction between the plate and an abutting end of an article to be weighed, would very probably occur when the conveyer section FS is raised. The danger of damage to the article as a result thereof, is readily apparent. It can also be seen that the stop plate should not be mounted so low on the side arms that it will not serve its purpose of stopping the articles, but it also should not be mounted so high that the articles will continue to be held from rolling onto the weighing section of the conveyer when the conveyer section FS is in its elevated position.

The portable approach PA in addition to supporting the conveyer feeder section FS, supports the operating mechanism for the control of the feeding section. The feeding section of the conveyer is connected to the portable approach PA by hinged means, any suitable type of which may be used. In the illustration shown, this hinged means consists of brackets 28 and 29 mounted on the under side of two cross bars attached to the lower flanges 30 of the channels or side rails of the feeding conveyer section FS, each bracket having an opening through which extends a rod 31 on which the brackets and the conveyer section can pivot. The ends of the rod 31 extend through and are supported by the upper ends of the back legs of the portable approach PA, in the manner illustrated.

A flat steel base plate 32 is adjustably mounted on frame members of the approach PA (Figs. 1 and 2), and may be raised or lowered by means of adjusting screws 33. This adjustment is desirable so that in elevating the feeding section FS of the conveyer relative to plate 32, to the operative position thereof (Fig. 2), as effected by means hereinafter to be described, the centers of the rollers 25 in the feeding section FS will lie in the plane passing through the centers of the rollers in the weighing section WS of the conveyer, thus enabling the article to be weighed to pass smoothly from the feeding section FS, over the stop roller 26, and onto the weighing section WS of the conveyer.

Mounted on the base plate 32 (Fig. 2) is a motor-reduction gear unit RM—1 which in operation, turns the gears 34 and 35, the gear 34 being driven from the motor unit, and in turn driving the gear 35 which is mounted upon and operatively secured to a cam shaft 36. Two spaced cam shaft brackets 37 and 38 are mounted on the base plate 32, and provide a support for the cam shaft 36, the upper ends of the brackets 37 and 38 being provided with bushings in which the cam shaft 36 is journalled. When the motor unit RM—1 is operated to turn the gears 34 and 35 and the cam shaft 36, the latter rotates eccentrics 39 and 40 secured to the ends of the cam shaft. A timing cam 41 is mounted on the timing cam shaft 36 adjacent the eccentric 40, the eccentric being located as shown between the timing cam 41 and the cam shaft bracket 38. Fixedly attached to the under side of two cross rods attached to the lower flanges 30 of the channels or side rails of the feeding section FS of the conveyer are two hardened metal bearing plates 42 and 43, each spaced from the channels by two spacers 42a and 43a, these plates engaging and seating upon the eccentrics 39 and 40, so that when the motor RM—1 is operated to turn the eccentrics, the feeding section of the conveyer FS will be alternately raised and lowered in a pivotal manner about the pivot rod 31, for each full revolution of the eccentrics 39 and 40. In Fig. 2 of the drawings the conveyer section FS is shown in its raised position, whereby an article may pass from the conveyer section FS, over the roller 26, and onto the weighing section WS to be weighed. The conveyer section FS is shown in its lowered position in dotted outline in Fig. 1, whereby an article on the feeding section of the conveyer will be stopped by the stop plate 27 until the motor is operated to raise the conveyer section to the position shown in Fig. 2. The operation of the motor also turns the timing cam 41 which operates a circuit-control device 44, preferably termed a micro-switch, the switch being mounted on an L-shaped bracket on the base plate 32. The function of this switch in the electrical control circuit will be hereinafter described.

At the discharge end of the weighing section

Figure 2:
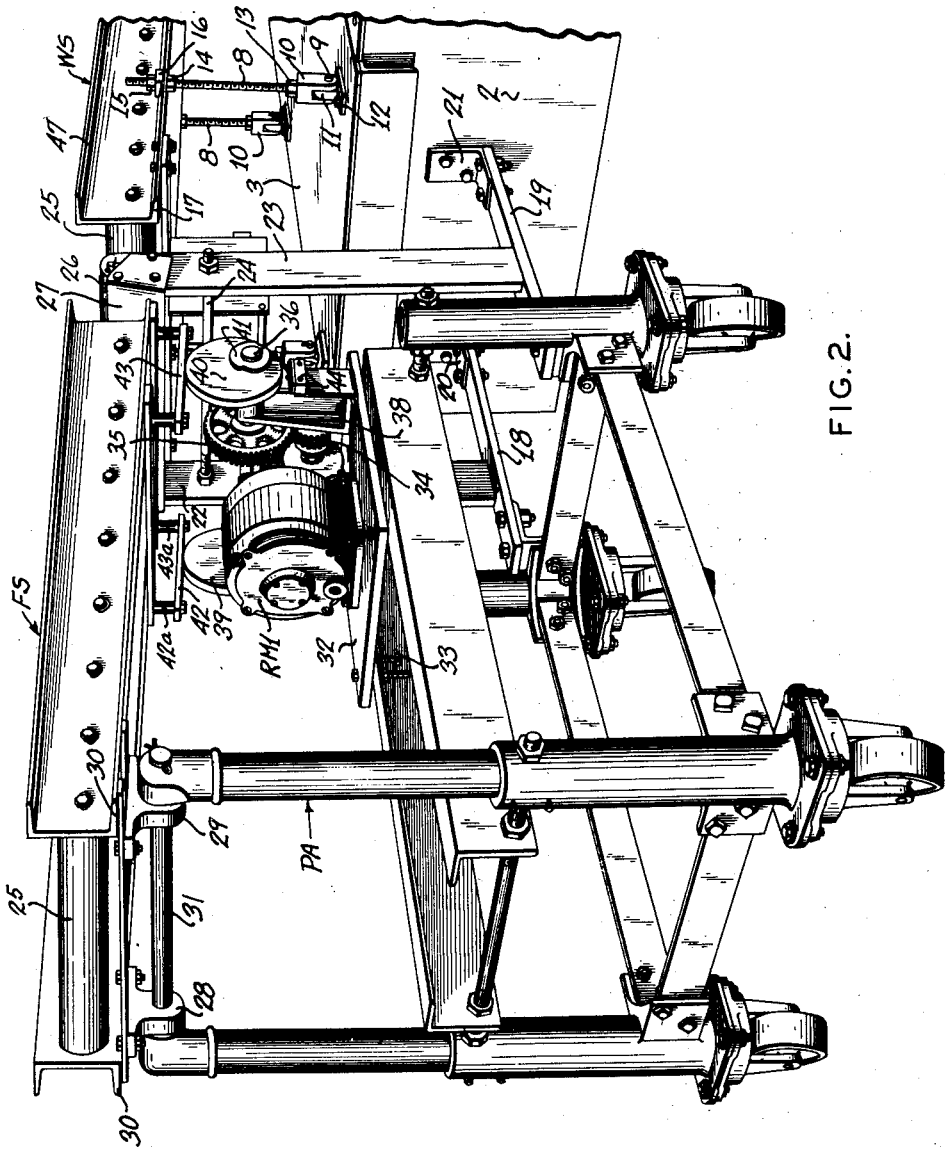
Fig. 2 is an enlarged, rear side elevation in perspective, of the feeding section of the conveyer, showing the control mechanism associated therewith, which functions to control transfer of articles therefrom to the weighing section of the conveyer.
Figure 3:
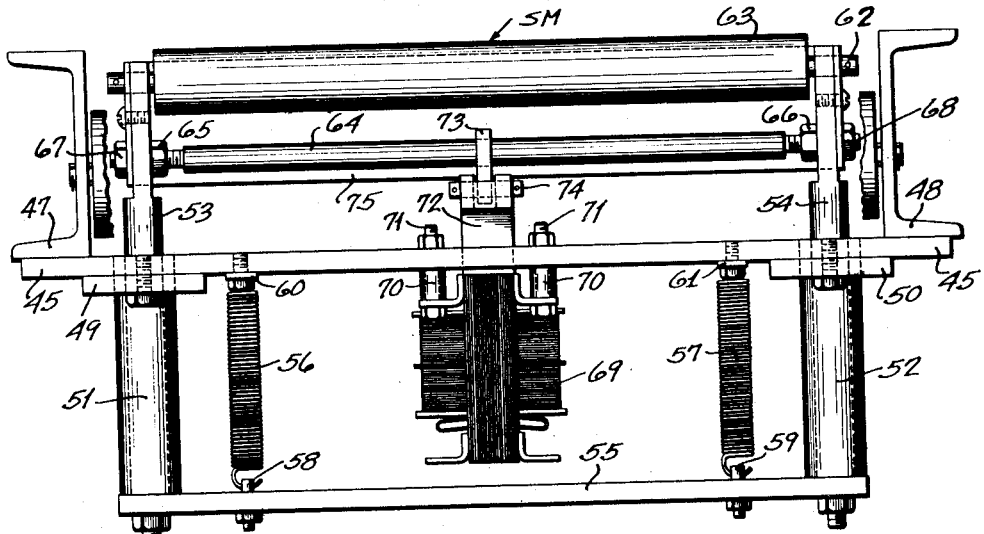
Fig. 3 is an enlarged transverse elevation of the discharge end of the weighing section of the conveyer, showing the stop means for temporarily holding the unit to be weighed on the weighing section until the completion of the weighing and weight recording cycle.

WS of the conveyer is located an article or package stop mechanism SM (Figs. 1 and 3) which operates to hold the article to be weighed on the weighing section WS of the conveyer until the weighing and weight recording operations have been completed, at which time the stop mechanism is operated to allow the article to pass onto the discharge section DS of the conveyer (Fig. 1). The stop mechanism is comprised of two flat elongated metal cross plates 45 and 46 fixedly attached horizontally to the lower flanges of the channels or side rails 47 and 48 of the conveyer. Fixedly mounted to the under side of two guide plates 49 and 50 mounted on the plates 45 and 46 are two spaced tubular guide posts 51 and 52 through which extend two roller posts 53 and 54, these roller posts projecting upwardly between the plates 45 and 46 and being connected at their lower ends by a spacing bar 55 which is secured thereto by lock nuts. One end of each of the coiled springs 56 and 57 is connected to the spacing bar by spring studs 58 and 59, the other ends of the springs being connected to spring studs (not shown) which are attached to two tie bars 60 and 61, the tie bars being mounted on the under sides of the cross plates 45 and 46. Mounted between the upper ends of the roller posts 53 and 54 is an elongated roller shaft 62, which extends through a tubular stop roller 63 which is similar to the rollers 25, fitted with ball bearings (not shown). Between the roller posts 53 and 54 and below the roller shaft 62 is mounted a spacing rod 64 which is threaded at each end, and by adjustment of the adjusting nuts 65 and 66 and the lock nuts 67 and 68 on the ends of the spacing rod 64, the relative spacing of the roller posts 53 and 54 may be readily adjusted so that the roller posts will slide smoothly in the guide posts 51 and 52. Attached to the under side of the cross plates 45 and 46 is a solenoid 69, which is held spaced therefrom by short spacers 70 through which extend the bolts 71 by which the solenoid 69 is attached to the cross plates 45 and 46. The outer end of the core member 72 of the solenoid is slotted to allow one end of a flat connector 73 to be inserted therein, it being held in place by means of a pin 74 which extends through both the core member 72 and the connector 73. The other end of the connector 73 is provided with a hole through which extends the spacing rod 64, thus forming the connection between the solenoid core member 72 and the spacing rod 64. A package stop plate 75 (Figs. 1 and 3) similar to the stop plate 27 on the stop mechanism at the approach end of the conveyer, is attached to the roller posts 53 and 54 in the same manner as the stop plate 27 is attached to the side arms 22 and 23, both stop plates serving the same purpose.

During the operating cycle, details of which will be hereinafter described, the solenoid 69 becomes energized and the core member 72 is drawn downward, bringing with it by means of the connector 73 and spacing rod 64, the roller posts 53 and 54, thereby lowering the stop roller 63 sufficiently to allow a package to roll over it onto the discharge section DS of the conveyer. Later during the operating cycle, the solenoid 69 becomes de-energized and the coiled springs 56 and 57 return the spacing bar 55, the roller posts 53 and 54 and the stop roller 63, back to their normal positions.

Figure 4:
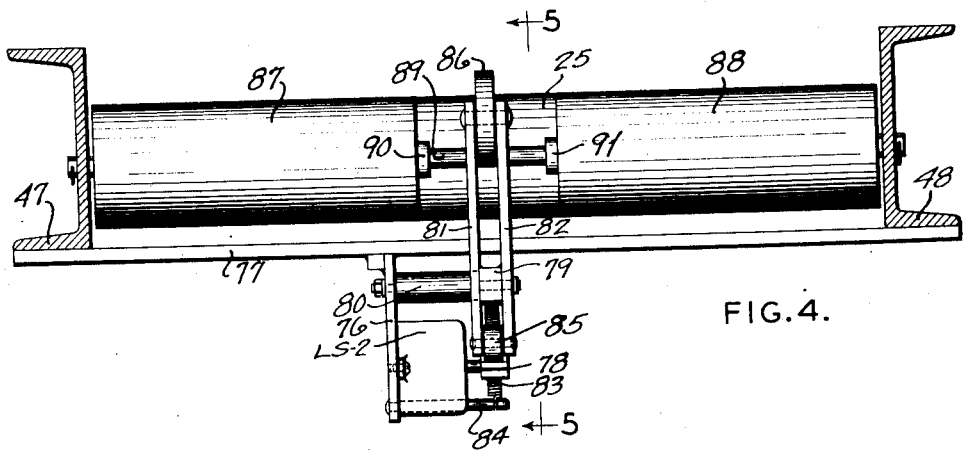
Fig. 4 is an enlarged transverse sectional elevation of the weighing conveyer section, as taken on the line 4—4 of Fig. 1, illustrating a limit switch assembly forming a part of the control mechanism.
Figure 5:
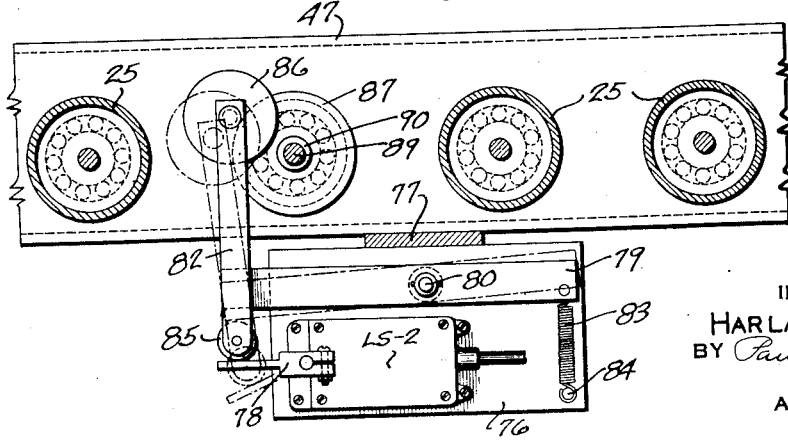
Fig. 5 is a fragmentary longitudinal section of the weighing conveyer section, as taken on the line 5—5 of Fig. 4, the view showing the limit switch and rollers of the conveyer.

Two limit switches LS—1 and LS—2 each substantially identical in structure, are mounted one near each end of the conveyer section WS. Each is secured to a flat vertically mounted supporting plate 76 (Figs. 1, 4 and 5) which is attached to a cross bar 77 fixedly mounted horizontally on the under sides of the lower flanges of the channels or side rails 47 and 48. The limit switches are each provided with a switch operating arm 78 which when pressed downward operates the contacts in the switch to function as will be described in the description of the electrical circuit. A roller arm supporting member 79 is pivotally mounted on a stud 80, one end being fixedly mounted between the two spaced roller arms 81 and 82. One end of a coiled spring 83 is connected to the opposite end of the member 79, the other end of the spring being attached to a stud 84 mounted on the supporting plate 76. Rotatably mounted between the lower ends of the spaced roller arms 81 and 82 is a small wheel 85, which provides rolling friction instead of sliding friction between the roller arms 81 and 82 and the switch operating arm 78, while rotatably mounted between the upper ends of the roller arms 81 and 82 is a roller wheel 86. The conveyer roller 25 at the zone of each switch roller 86, is replaced by spaced rollers 87 and 88, located on the weighing section WS adjacent the point where the roller wheel 86 and arms 81 and 82 of the limit switch project upwardly through the conveyer. The ends of a shaft 89 are fixedly mounted to the channels or side rails 47 and 48 of the conveyer, the shaft 89 passing through the rollers 87 and 88. The rollers 87 and 88, as well as the rollers 25, are adapted to roll on ball bearings, as can be seen in dotted outline in Fig. 5. Two spaced collars 90 and 91, which are fixedly mounted on the shaft 89, separate the two rollers 87 and 88 to provide clearance for the switch operating mechanism, in the manner shown in Figs. 4 and 5. In operation, when a package comes over the rollers 25 and 87—88, and strikes the roller wheel 86, the weight of the package is sufficient to press the wheel 86 and the arms 81 and 82 downward, as shown in dotted outline in Fig. 5, forcing down the switch operating arm 78 and thereby operating the limit switch. When the package has passed over the roller 86 the spring 83 brings the switch operating means back to its normal position, thereby releasing the switch.

Figure 6:
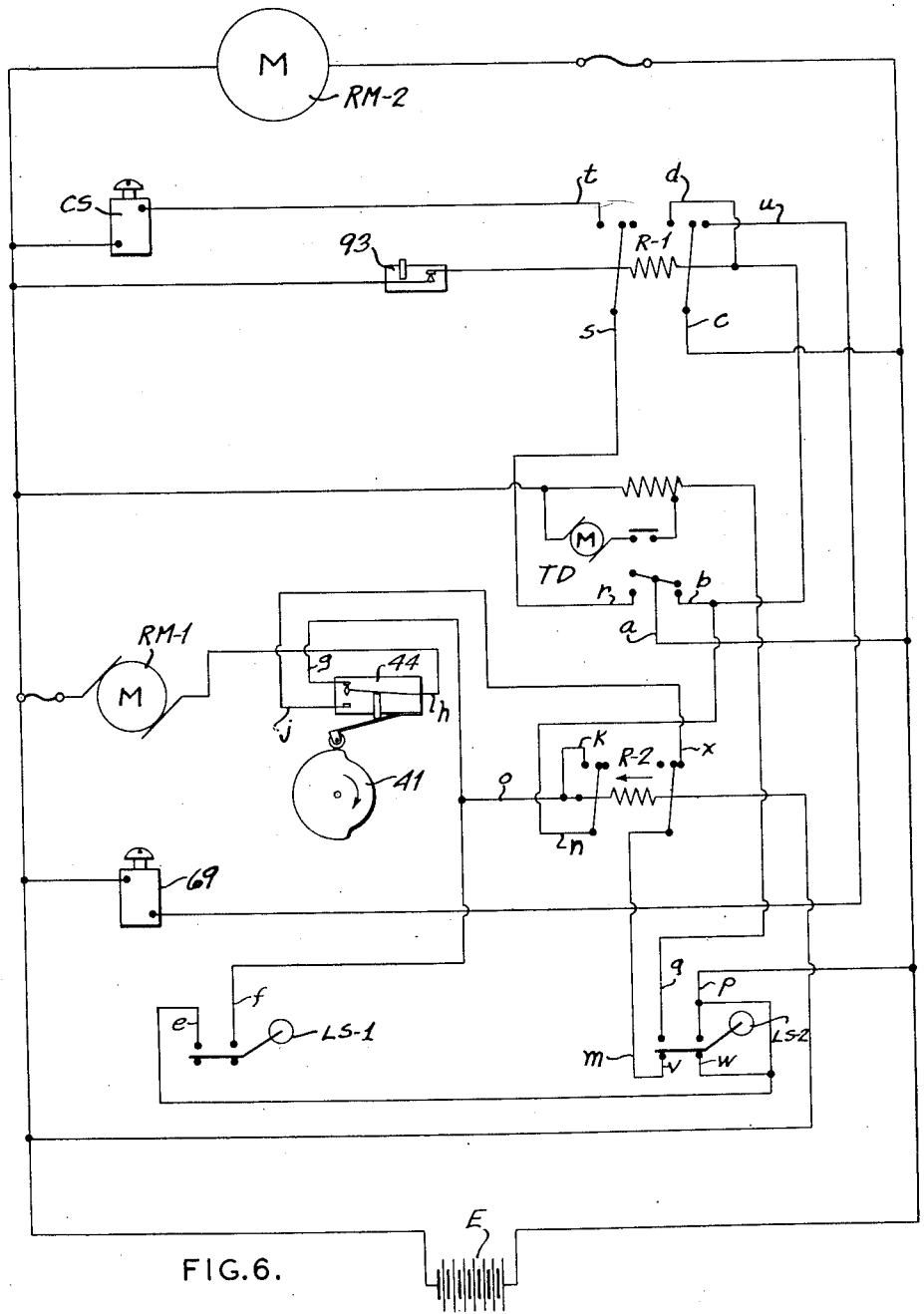
Fig. 6 is a wiring diagram of the electrical control circuits, showings the solenoids, relays, and switches operated thereby.

A standard time delay mechanism TD, which mechanism is well known in the art and the circuit elements of which are diagrammatically shown in Fig. 6, is mounted on the end of the scale beam housing 5 (Fig. 1) for the purpose of delaying the recording cycle until the indicator 92 of the weigher scale has come to rest, or until a definite time period has elapsed, at which time it operates to permit the weight of the package on the conveyer weighing section WS to be recorded, and also through a micro-switch designated as 93 in the recorder circuit (Fig. 6) to operate the stop mechanism SM, allowing the package to leave the weighing section of the conveyer and responsively thereto, to condition the feeder mechanism for allowing another package to come onto the weighing section.

The cycle of operation will become apparent from the following description of the electrical circuit arrangement illustrated in Fig. 6. The recorder motor RM—2 is energized by a source of energy E, and by preference is adapted to operate continuously, but without effect on the recorder mechanism until a magnetic clutch forming a part of such mechanism, is energized. Limit switches LS—1 and LS—2 are normally in the circuit position shown, and a relay R—1 is adapted to be energized through the back contacts of the time delay mechanism TD, through circuit *a—b*, and upon energization, is locked closed through its own contacts, controlling holding-circuit *c—d*. When a package comes onto the weighing section of the conveyer WS it closes limit switch LS—1, closing circuit *e—f* to motor RM—1 via the circuit *g—h* through the micro-switch 44, thus energizing the reduction gear motor RM—1 controlling the approach mechanism, which operates the eccentrics through one-half a revolution to lower the feeding section of the conveyer FS, whereby to prevent any more packages from coming onto the weighing section of the conveyer. The motor RM—1 also rotates the timing cam 41 by one-half a revolution, which operates the micro-switch 44 to open the circuit *g—h* to stop motor RM—1, and to close circuit *h—j* for further energization of motor RM—1 in response to operation of a circuit control element, as will later appear. When limit switch LS—1 closes circuit *e—f*, it also energizes a relay R—2 through circuit *e—f—o*, thereby breaking circuit *x—m*, and after the opening of limit switch LS—1, which is done when the package passes far enough along the conveyer to release the switch, relay R—2 is still held closed through circuit *n—k*, and the back contacts of circuit *a—b* on the time delay TD. When the package has passed far enough along the conveyer after opening limit switch LS—1, it closes limit switch LS—2, closing circuit *p—q*, which energizes the coil of the time delay relay TD. After a definite predetermined time period has elapsed to allow the scale indicator 92 to position itself at the proper graduation on the dial face, circuit *a—r* is closed and circuit *a—b* is opened. The closing of circuit *a—r*, energizes the clutch solenoid CS of the recorder mechanism through circuit *s—t* on relay R—1, causing the recorder to go through its printing cycle, and near the end of its printing cycle the micro-switch 93 in the recorder mechanism is momentarily opened, de-energizing relay R—1, opening circuits *s—t* and *c—d*, and closing circuit *c—u*. This results in deenergization of the relay R—2 through open-circuiting of the circuit *c—d*, and also causes through closure of the circuit *c—u*, energization of the discharge stop solenoid 69 which operates, as has been hereinbefore described, to allow the package to leave the weighing section of the conveyer WS. When the package is nearly off this section of the conveyer limit switch LS—2 is released, opening circuit *p—q* and closing circuit *v—w*. When the limit switch closes circuit *v—w* and *x* through relay R—2, the motor RM—1 is again energized through closed circuit *j—h*, rotating the eccentrics and timing cam another one-half revolution and positioning the feeding section of the conveyer FS in its elevated position, so that another package may be fed onto the weighing section WS of the conveyer, to be weighed. This completes the cycle and the operation will repeat itself for each succeeding article to be weighed, so long as the circuit is energized.

The conveyer scale assembly and control mechanism fully attain the foregoing enumerated objects, as well as others now readily apparent, and provide an effective and efficient article weighing assembly for conveyer systems. Both the conveyer scale and article feeder sections are portable and fully adjustable, thereby enabling them for ready insertion in existing conveyer systems.

While I have shown a preferred embodiment of my invention it is evident that changes and modifications in the construction herein shown and described may be made that would come within the scope thereof and it is not intended, therefore, to limit the invention to the precise details of construction shown.

I claim:

1. In a conveyer scale assembly, a plurality of normally operatively associated roller feed conveyer sections, one thereof constituting a feeder section for another and being displaceable out of feeding association therewith, weighing mechanism operable responsive to loading of the last said section, and means operated by a unit to be weighed during movement thereof onto the weighing section, for causing displacement of said feeder section to effect a physical isolation of said sections, whereby to prevent conveyance of a unit from one to the other thereof.

2. In a conveyer scale assembly, a plurality of normally operatively associated gravity feed conveyer sections, one thereof constituting a feeder section for another and being displaceable out of feeding association therewith, weighing mechanism operable responsive to loading of the last said section, means operated by and during gravity movement of a unit to be weighed onto the weighing section, for causing displacement of said feeder section to effect a physical isolation of said sections, whereby to prevent conveyance of a unit from one to the other thereof, means in the path of the unit in moving over said weighing section, operable by engagement of the unit therewith, to effect operation of said weighing mechanism to determine the weight of the unit, and means responsive to completion of the determination in the weighing section for permitting gravity discharge movement of the unit therefrom.

3. In a conveyer scale assembly, a pair of normally operatively related conveyer sections, a first thereof arranged to feed the units to be weighed, to the second section, a pair of control elements spaced apart in the path of the unit in moving from end to end of the weighing section, means operable by engagement of a unit to be weighed, with the first said element to check movement of a subsequent unit onto the weighing conveyer section; means operable by engagement of the unit to be weighed with the second said control element to effect an automatic determination of weight of the unit, means responsive to completion of the said determination providing for delivery of the unit from the weighing section of the conveyer and to re-establish feeding relation of the first and second said conveyer sections.

4. In a conveyer scale assembly, a pair of normally operatively related conveyer sections, a first thereof arranged to feed the units to be weighed, to the second or weighing section, a pair of switch actuating elements spaced apart in the path of the unit as it moves from end to end of the weighing section, switches associated with said elements, electrical means in circuit with said switches and operable by engagement of the units to be weighed, with the first said switch actuating element, to check movement of a subsequent unit onto the weighing section, electrical means operable by engagement of the unit to be weighed, with the second said switch control element to effect an automatic determination of weight of the unit, and electrical means responsive to completion of the determination conducted on the weighing conveyer section, said means operable to provide for delivery of the unit from said conveyer section and operable to re-establish a unit delivering relation between said first and second conveyer sections.

5. In a conveyer scale assembly, a pair of normally operatively related conveyer sections, a first thereof arranged to feed the units to be weighed, to a second or weighing section, a pair of limit switches each having a control element in the path of the unit in moving from end to end of the weighing section, the limit switch control elements being spaced endwise along said section, electrical means associated with the first of said switches, serving to check movement of a subsequent unit onto the weighing conveyer section, electrical means operable by actuation by the unit of the second limit switch to effect an automatic determination of a characteristic, such as the weight of the unit, and switching means arranged for actuation by mechanism for determining the weight of the unit, and effecting delivery of the unit from the weighing section of the conveyer, and electrical means operable responsive to the last said movement for restoring the feeding relation of the first and second said conveyer sections, whereby to provide delivery of the subsequent unit to the last said section.

6. In a conveyer scale and weight recording assembly, a pair of normally operatively related conveyer sections, the first thereof being arranged to feed the units to be weighed, in step by step order, to the second section, weighing and weight recording apparatus associated with the second section, a pair of switch actuating elements spaced in the path of the unit in moving from end to end of the weighing and recording section, switches associated with said elements, electrical means operable by engagement of a unit to be weighed with the first of said switch actuating elements to check movement of a subsequent unit onto the weighing conveyer section, the last said means including an electric motor and means for rockably actuating the first or feeder section into and out of unit delivering relation to the weighing section, electrical means including a time delay mechanism operable by engagement of the unit to be weighed, with the second said switch actuating element to effect an automatic determination of weight of the unit, and a recording of such weight, a switch responsive to completion of said recording, and electro-magnetic means associated with the last said switch arranged to effect delivery of the unit from the weighing and recording section of the conveyer, and circuit means including said motor on the feeder section, operable responsively to the second said switch, to establish unit feeding relation of the first said conveyer section to the second such section.

7. In a conveyer scale assembly, a weighing scale mechanism, a conveyer section associated with said mechanism and serving as a weighing section to receive and support a unit to be weighed, in the weight determination thereof by said mechanism, a unit feeder conveyer section terminating adjacent one end of said weighing section, providing for the delivery of units to be weighed, onto the latter section, said feeder section being arranged for movement into and out of unit feeding relation to the weighing section, means for effecting such movements of the feeder section, and a control for said means responsive solely to engagement therewith by a unit to be weighed, during delivery of the unit from the feeder section onto said weighing section, to cause operation of said means to effect movement of the said feeder section out of unit feeding relation to the weighing section.

8. In a conveyer scale assembly, a weighing scale mechanism, a weighing conveyer section associated with said mechanism and serving for the support of a unit to be weighed, in the weight determination thereof by said mechanism, a unit feeder conveyer section terminating adjacent one end of said weighing section, providing for the delivery of units to be weighed, onto the weighing section, said feeder section being arranged for movement into and out of unit feeding relation to said weighing section, means for effecting such movements of the feeder section, a control for said means responsive to engagement therewith by a unit during delivery thereof from the feeder section onto the weighing section, to cause operation of said means to effect movement of the feeder section out of unit feeding relation to the weighing section, and a second control for said means, arranged for engagement by the unit on said weighing section, during the weight determination of the unit by said weighing mechanism, said second control being effective upon disengagement of the unit therewith, to cause operation of said means to effect movement of the feeder section into unit feeding relation to the weighing section.

9. In a conveyer scale assembly, a weighing scale mechanism, a weighing conveyer section associated with said mechanism and serving for the support of a unit to be weighed, in the weight determination thereof by said mechanism, a unit feeder conveyer section terminating adjacent one end of said weighing section, providing for the delivery of units to be weighed, onto the weighing section, said feeder section being arranged for movement into and out of unit feeding relation to said weighing section, means for effecting such movements of the feeder section, a control for said means responsive to engagement therewith by a unit during delivery thereof from the feeder section onto the weighing section, to cause operation of said means to effect movement of the feeder section out of unit feeding relation to the weighing section, and a control device arranged for engagement by a unit to be weighed when delivered onto said weighing section, and effective upon such engagement to condition said weighing mechanism for operation to determine the weight of the unit, said control device further, being effective upon disengagement of the unit therewith, to cause operation of said means to effect movement of the feeder section into unit feeding relation to the weighing section.

10. In a conveyer scale assembly, a weighing scale mechanism of automatic type, a gravity feed weighing conveyer associated with said mechanism and serving for the support of a unit to be weighed, in the weight determination thereof by said mechanism, a unit feeder device capable of being moved into and out of unit feeding relation to said weighing conveyer, operating means operatively associated with said feeder device, adapted for effecting such movements thereof, a control for said operating means arranged in the path of a unit in passing from said feeder device onto said weighing conveyer, and being responsive solely to engagement by the unit, to cause operation of said operating means to effect movement of the feeder device out of unit feeding relation to the weighing conveyer, a second control arranged for engagement by the unit in its gravity movement along said weighing conveyer, said second control when engaged by the unit, serving to condition said weighing mechanism for automatic determination of the weight of the unit, and releasable means serving to retain the unit on the weighing conveyer and in engagement with said second control during the weight determination thereof, said second control being in controlling relation to said operating means such that upon subsequent release of the unit by said retaining means, said control is effective in response to disengagement of the unit therewith, to cause operation of said operating means to effect movement of the feeder device into unit feeding relation to said weighing conveyer.

11. In a conveyer scale assembly, a weighing conveyer section of gravity feed type, weighing mechanism and a control therefor, operable in response to loading of the conveyer section by a unit to be weighed and upon engagement of the unit with said control, a unit feeder conveyer section of gravity feed type, movable into and out of unit feeding relation to the weighing section, and means operable in response to and during gravity feed of a unit from the feeder section onto said weighing section, to move said feeder section out of unit feeding relation to said weighing section, said means further being operable in response to gravity discharge of a unit from said weighing section and following disengagement of the unit with said control, to move said feeder section into unit feeding relation with said weighing section.

12. In combination with a conveyer formed of a plurality of normally juxtaposed conveyer sections, weighing mechanism associated with one of said sections for effecting weight determination of a unit disposed thereon, another of said sections arranged to serve as a feeder or delivery portion of the conveyer to the weight determination section, said feeder section being pivotally mounted for pivotal movement into and out of unit feeding relation to the other section, and means of automatic type, operable in response to transfer of a unit from the feeding section to the determination section, to cause pivotal movement of the feeder section out of unit feeding relation to the determination section, and in response to discharge of a unit from said last section, to cause pivotal movement of the feeder section into unit feeding relation to the determination section.

HARLAN A. HADLEY.